W. H. GUILD.

Process of Purging and Draining Sugar.

No. 3,797. Reissued Jan'y 18, 1870.

Witnesses:
Fred: Haynes.
J. W. Combs.

Inventor:
Wm H Guild.

N. PETERS, Photo-Lithographer, Washington, D. C.

United States Patent Office.

WILLIAM H. GUILD, OF BROOKLYN, NEW YORK.

*Letters Patent No.* 87,487, *dated March* 2, 1869; *reissue No.* 3,797, *dated January* 18, 1870.

IMPROVEMENT IN PURGING AND DRAINING SUGAR.

The Schedule referred to in these Letters Patent and making part of the same

*To all whom it may concern:*

Be it known that I, WILLIAM H. GUILD, of Brooklyn, in the county of Kings, and State of New York, have invented a new and useful Improvement in the Process of Purging and Draining Sugar; and I do hereby declare that the following is a full, clear, and exact description of the same, reference being had to the accompanying drawing, forming part of this specification.

This invention consists in subjecting sugar, while being purged or drained, by pressure acting upon its surface, in consequence of a vacuum produced underneath it, to the action of steam, or the vapor of water, which, being admitted to its upper surface, percolates among and between its granules, and moistens them, thereby facilitating, expediting, and more thoroughly effecting the purging and purification, without the drenching and dissolution of the sugar consequent upon purging with water.

Also, the invention embraces the drying of sugar, by forcing or drawing currents of air through it. Such air may either be cold or heated, and is preferably caused to percolate through the sugar, by its exposure to a vacuum, when spread out on a reticulated bottom, within a suitable chamber, containing or admitting the air, used for effecting the drying, said air being caused to pass through the sugar by its endeavor to restore an equilibrium to the vacuum-space, to which the sugar is exposed, and in thus passing through the sugar, carrying the moisture along with it.

In carrying out the invention, the sugar may be placed in a chamber or apartment, with a perforated false bottom or horizontal partition, upon which the sugar is placed, and below which a vacuum, or partial vacuum is produced, by an air-pump, or other means, while the steam or vapor, with or without air, is admitted above, as represented in the accompanying drawing, in which—

Figure 1:
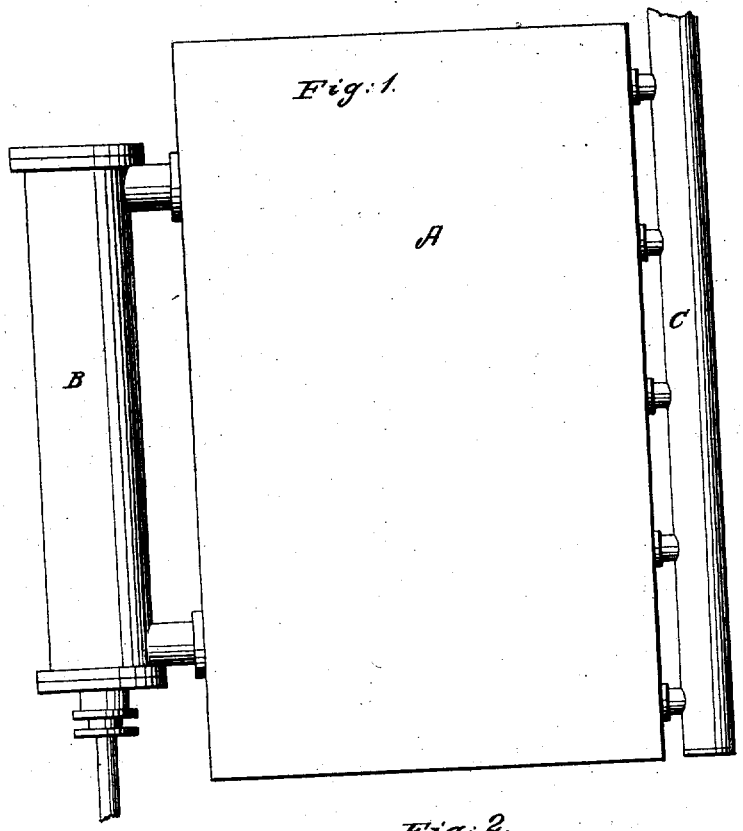

Figure 1 is a plan view, and

Figure 2:
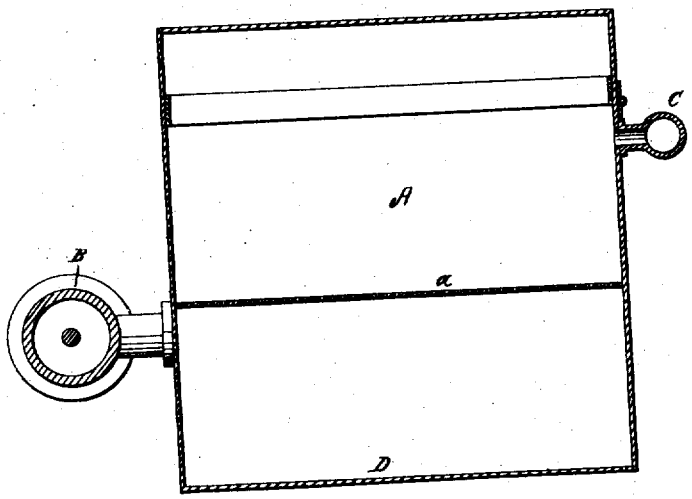

Figure 2, a vertical sectional view of the same.

A is a chamber, having the false bottom or horizontal partition *a*, made perforated, reticulated, or foraminous, and having the air-pump B connected with it, below the said bottom or partition; also, having the steam-pipe C connected with it, at one or more, but preferably at numerous points, above the said bottom or partition.

The upper part of the chamber A is not required to be air-tight, but only closed to such an extent as to prevent the diffusion and escape of the steam.

In the operation of this apparatus, the sugar having been spread over the false bottom *a*, the air-pump is set in operation, and steam at a low pressure, or, if of high pressure, in very small quantities, is admitted through the pipe C. The exhaust from a steam-engine will serve very well for the purpose.

The steam, spreading itself over the surface of the sugar, while a partial vacuum is produced below it, will percolate among and between the granules, moistening them to a suitable, yet not excessive degree, and so assisting and expediting the purging and cleansing-process.

In order that the sirup or liquor which drains through and from the sugar may be prevented from passing through the air-pump, and clogging or choking it, the air-pump is connected with the chamber A, at some distance above the bottom proper D, so that the sirup or liquor may fall into the lower part of the chamber A, from which it may be drawn off from time to time, by any suitable means.

When the sugar is sufficiently purged, the steam is shut off, while the air-pump is kept in operation, and the admission of air, either cold or heated, is continued to the upper part of the chamber A, such air percolating through the sugar, for the purpose of drying it.

What is here claimed, and desired to be secured by Letters Patent, is—

1. Subjecting sugar, while being purged or drained, to the action of steam or vapor, substantially as and for the purpose herein described.

2. The process of purging sugar by spreading it over a perforated or reticulated bed or floor, and producing a vacuum, below said bed or floor, substantially as herein described.

3. The process of drying sugar by forcing or drawing currents of heated air through it, while it is spread over a perforated or reticulated bed or bottom, substantially as herein described.

WM. H. GUILD.

Witnesses:
FRED. HAYNES,
R. E. RABEAU.